United States Patent
Cais et al.

(10) Patent No.: US 12,428,853 B2
(45) Date of Patent: Sep. 30, 2025

(54) MULTILAYER PANEL FOR THE CONSTRUCTION INDUSTRY AND METHOD FOR THE LAYING OF THE SAME

(71) Applicant: IWIS INSULATION WATERPROOFING INDUSTRIAL SYSTEMS S.R.L., Vittorio Veneto (IT)

(72) Inventors: Federico Cais, San Vendemiano (IT); Emilio Mazzer, San Fior (IT)

(73) Assignee: IWIS INSULATION WATERPROOFING INDUSTRIAL SYSTEMS S.R.L., Vittorio Veneto (IT)

(*) Notice: Subject to any disclaimer, the term of this patent is extended or adjusted under 35 U.S.C. 154(b) by 175 days.

(21) Appl. No.: 18/020,709

(22) PCT Filed: Aug. 12, 2021

(86) PCT No.: PCT/IB2021/057439
§ 371 (c)(1),
(2) Date: Feb. 10, 2023

(87) PCT Pub. No.: WO2022/038465
PCT Pub. Date: Feb. 24, 2022

(65) Prior Publication Data
US 2023/0349164 A1  Nov. 2, 2023

(30) Foreign Application Priority Data
Aug. 19, 2020 (IT) .......................... 102020000020263

(51) Int. Cl.
*E04F 13/08* (2006.01)
*E04B 1/76* (2006.01)
*E04F 13/18* (2006.01)

(52) U.S. Cl.
CPC .......... *E04F 13/0866* (2013.01); *E04F 13/18* (2013.01); *E04B 1/7675* (2013.01); *E04F 2201/026* (2013.01)

(58) Field of Classification Search
CPC ........ E04F 13/086; E04F 13/18; E02D 31/02; E02D 31/025; E02D 31/004
See application file for complete search history.

(56) References Cited

U.S. PATENT DOCUMENTS 4,730,953 A * 3/1988 Tarko ...................... E02B 11/00
405/50
4,840,515 A * 6/1989 Freese ..................... E02D 31/02
405/36

(Continued)

FOREIGN PATENT DOCUMENTS

DE       2518858 A1    11/1976
DE  102011118851 A1 *  5/2013  ............. E04C 2/243

(Continued)

OTHER PUBLICATIONS

International Search Report and Written Opinion issued Nov. 24, 2021 in PCT/IB2021/057439, 15 pages.

*Primary Examiner* — Theodore V Adamos
(74) *Attorney, Agent, or Firm* — Element IP, PLC

(57) ABSTRACT

A panel for the construction industry suitable for being fixed to cover a surface of a building structure, the panel including a first layer including an expanded plastic material, a second layer, impermeable or substantially impermeable to water and steam, fixed, directly or indirectly, to the first layer, a third layer, fixed, directly or indirectly, to the first layer on the side opposite to the second layer, and including a plurality of first bulges, spaced apart from each other so as to define an air channel between them, and having the same height.

23 Claims, 7 Drawing Sheets

(56) References Cited

U.S. PATENT DOCUMENTS

| | | | | |
|---|---|---|---|---|
| 4,943,185 | A | * | 7/1990 | McGuckin ............. E02B 11/00 |
| | | | | 405/38 |
| 8,955,278 | B1 | * | 2/2015 | Mills ................. E04F 15/02038 |
| | | | | 52/302.3 |
| 2006/0260233 | A1 | | 11/2006 | Schluter |
| 2011/0220098 | A1 | * | 9/2011 | Ventelon ................. F24S 23/82 |
| | | | | 126/684 |
| 2014/0242871 | A1 | * | 8/2014 | Yasui ..................... B32B 17/04 |
| | | | | 442/412 |

FOREIGN PATENT DOCUMENTS

| | | | | | |
|---|---|---|---|---|---|
| EP | | 2213811 | A2 | | 8/2010 |
| EP | | 3467208 | A1 | * | 4/2019 ............ E01C 3/006 |
| KR | 20160124605 | A | * | 10/2016 ............ E04B 1/806 |
| WO | WO-2016120711 | A2 | | 8/2016 |
| WO | WO-2017021821 | A1 | | 2/2017 |
| WO | WO-2018130720 | A1 | * | 7/2018 ........... B32B 15/046 |
| WO | WO-2020148662 | A1 | | 7/2020 |

* cited by examiner

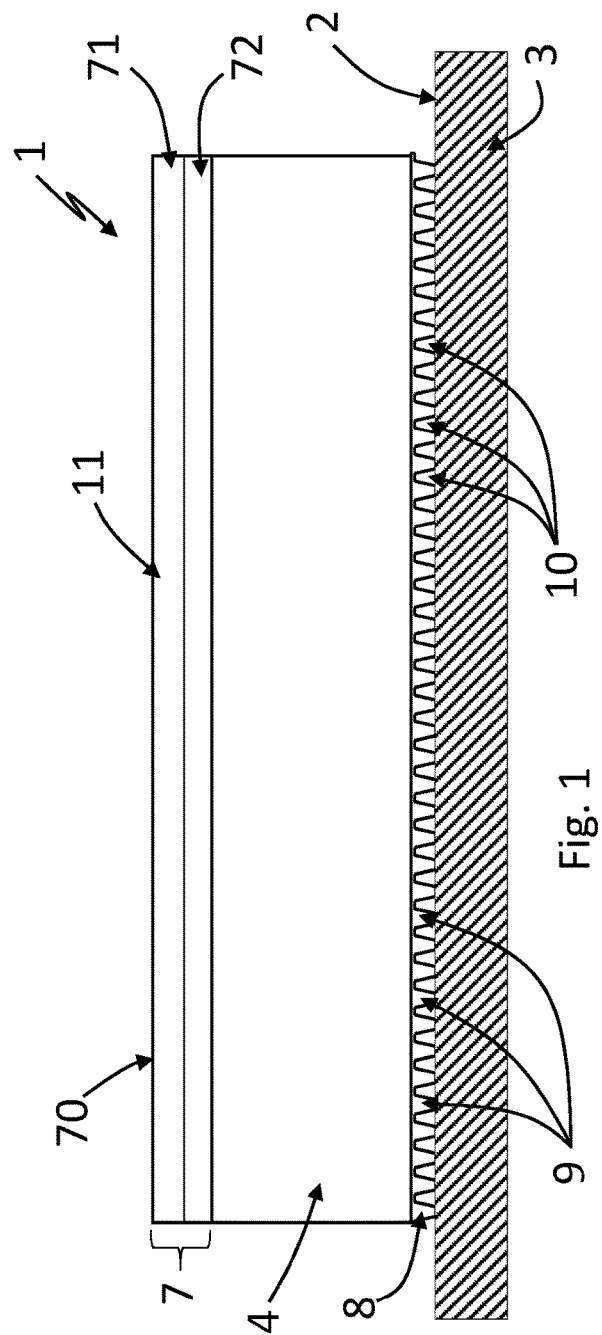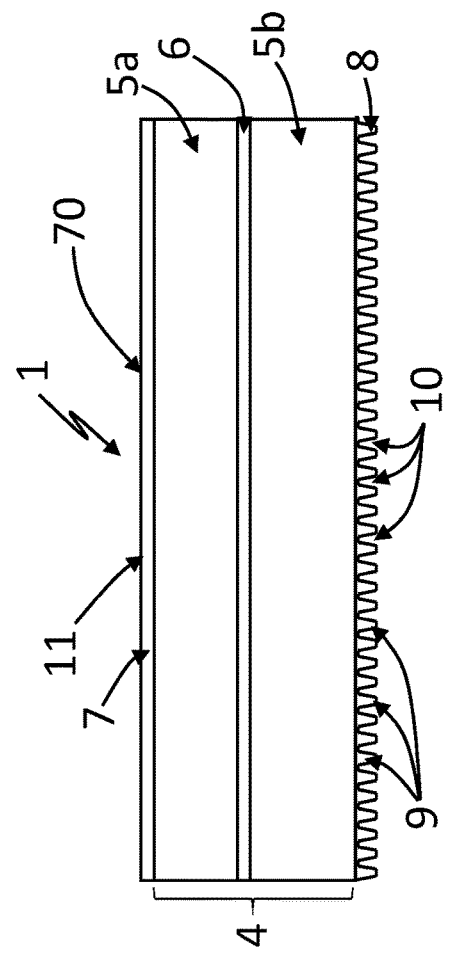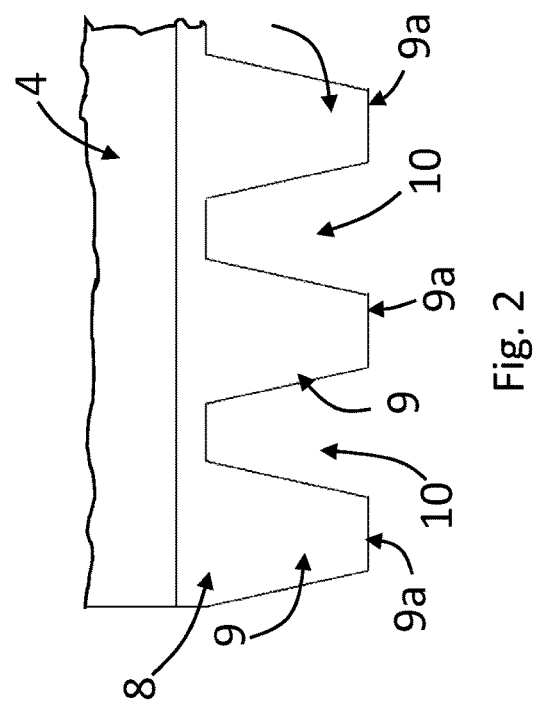

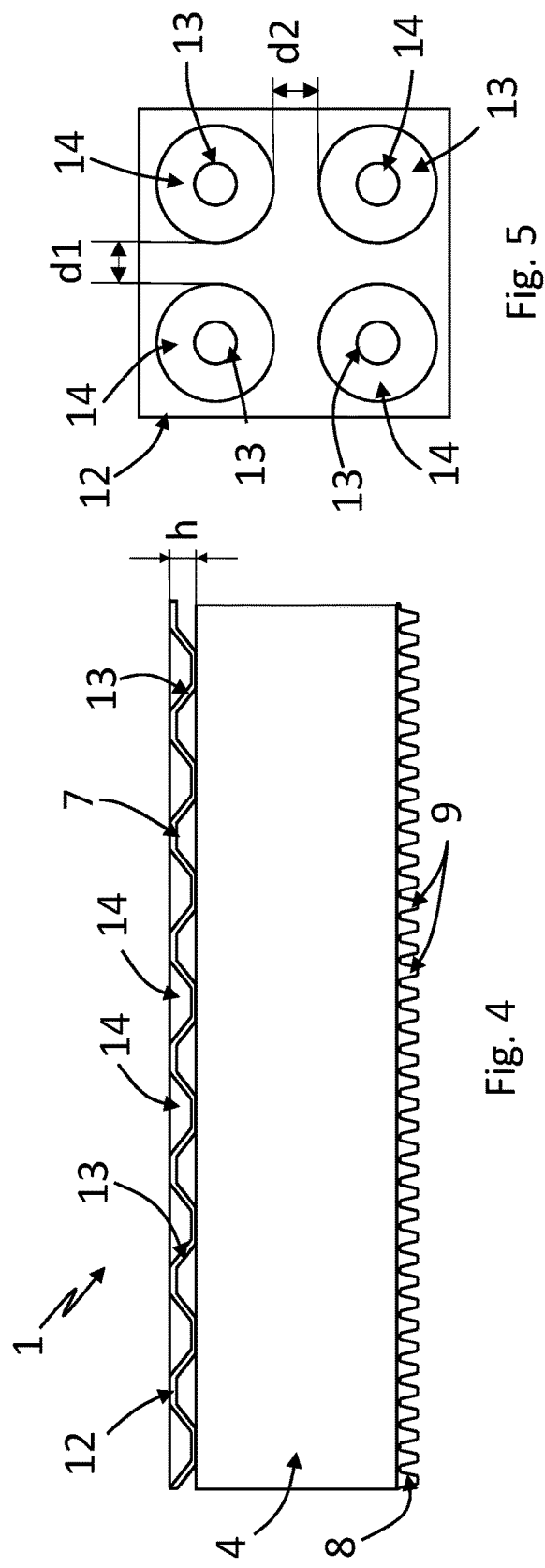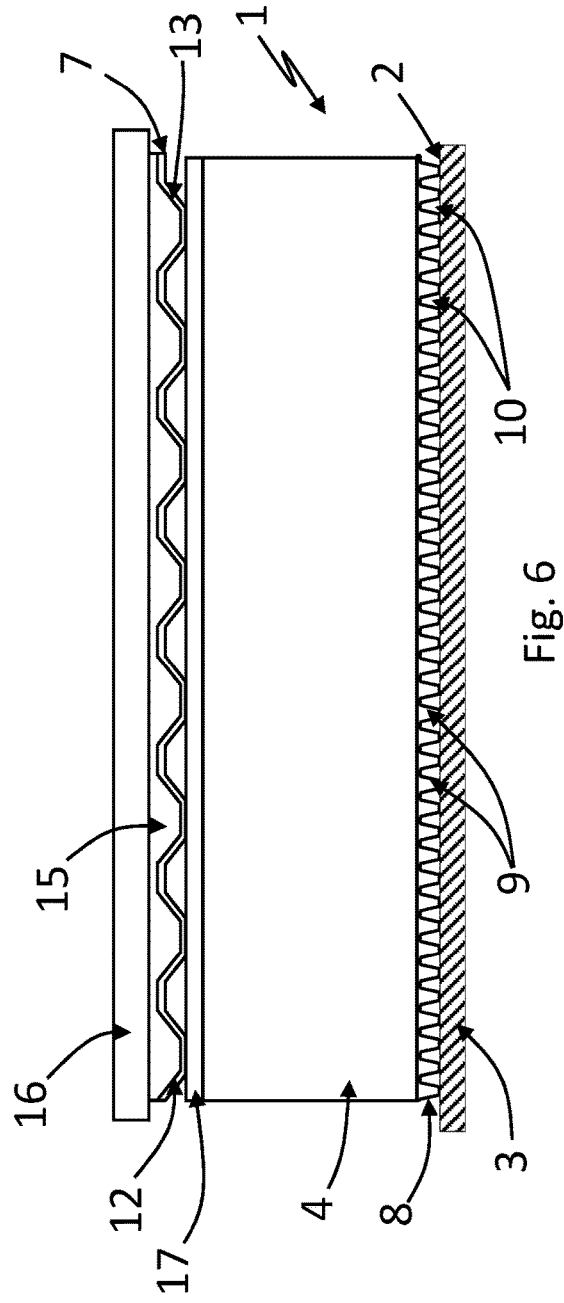

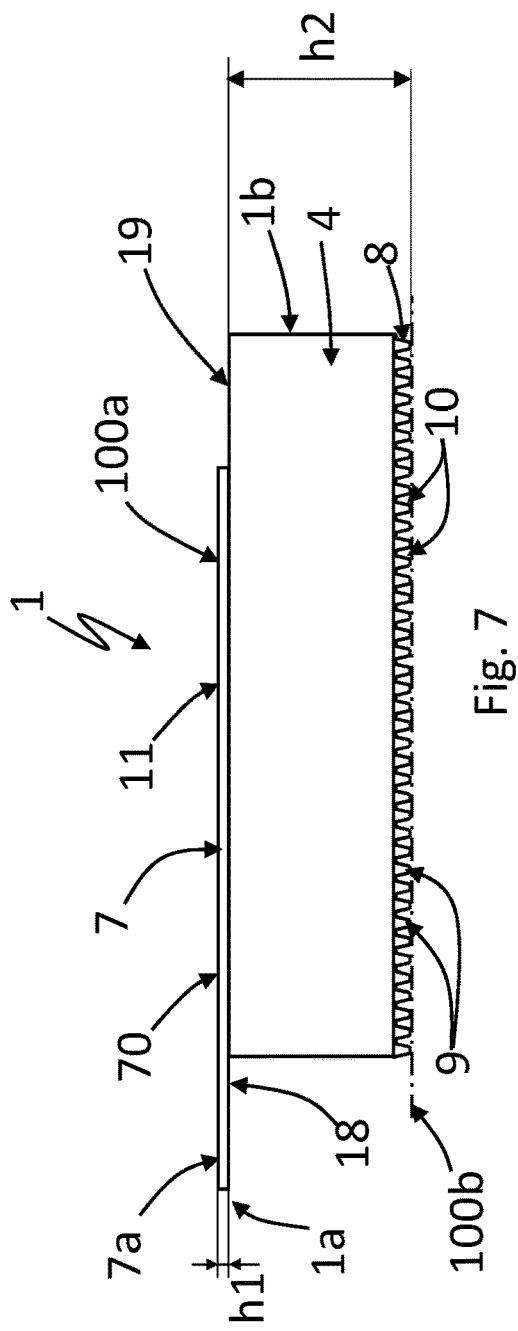
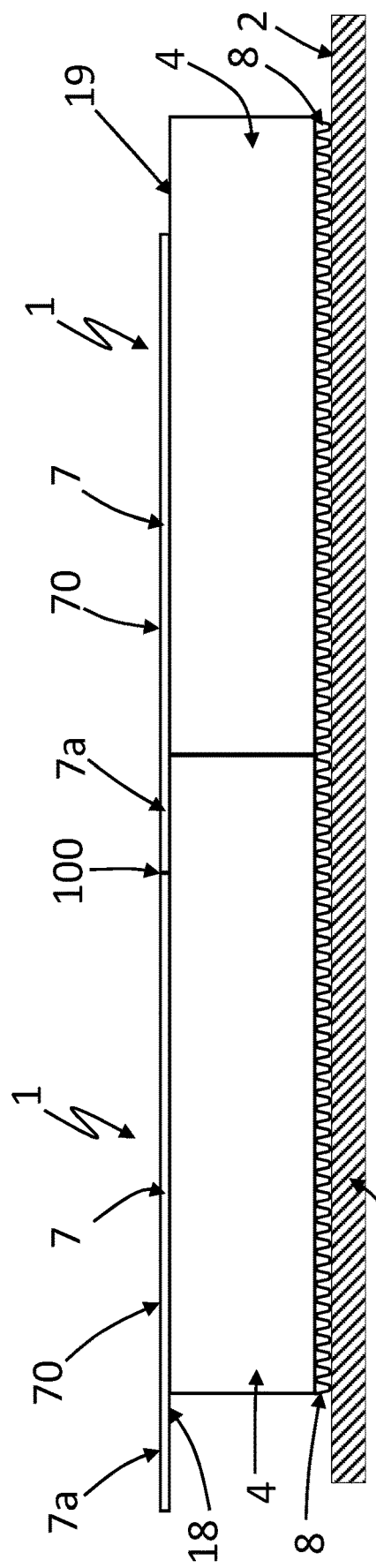

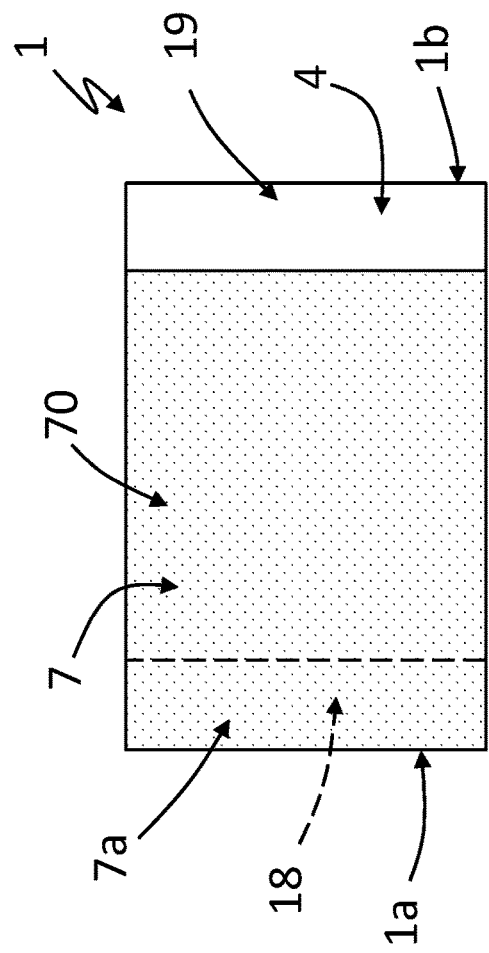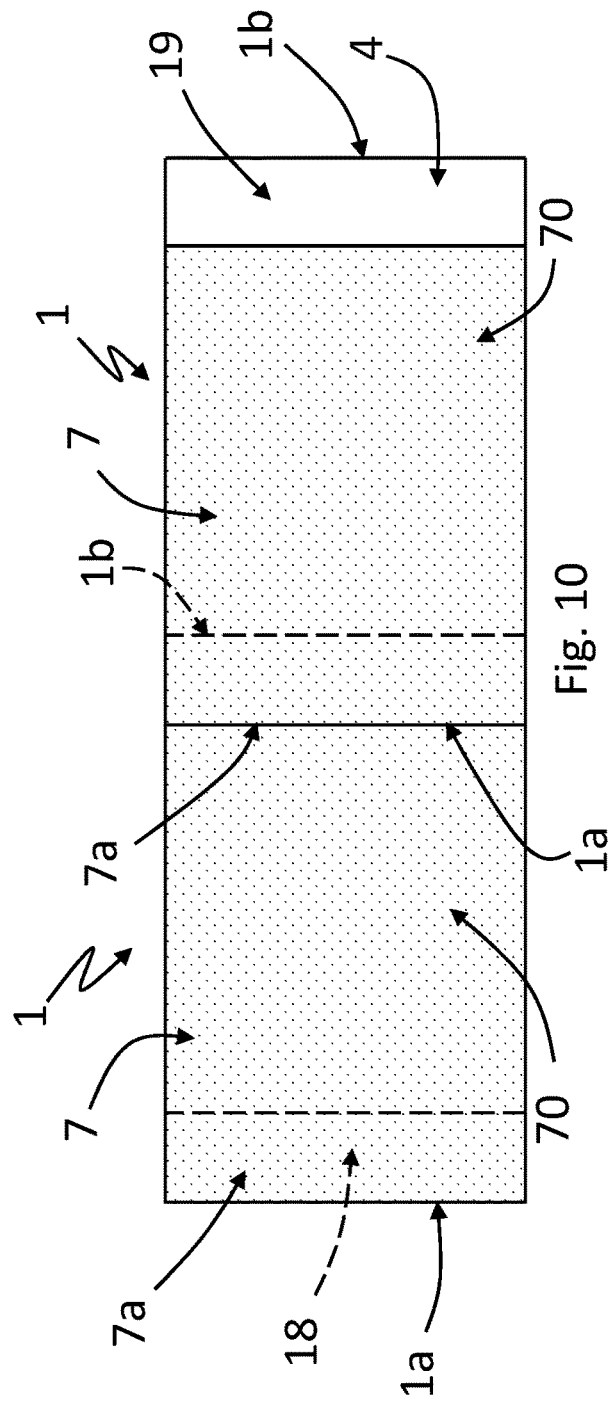

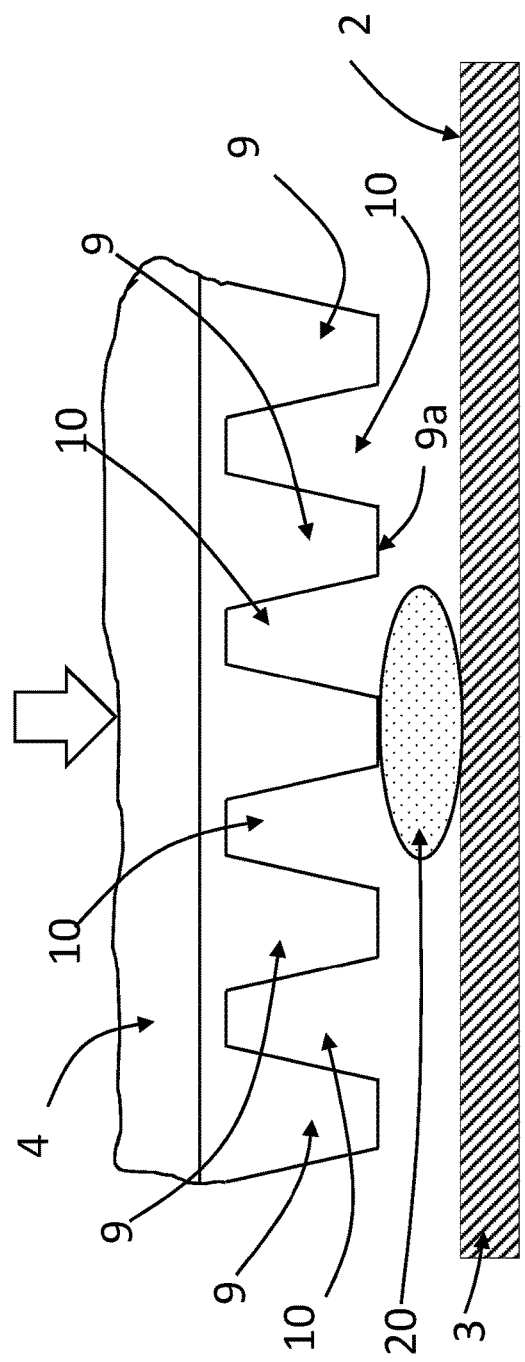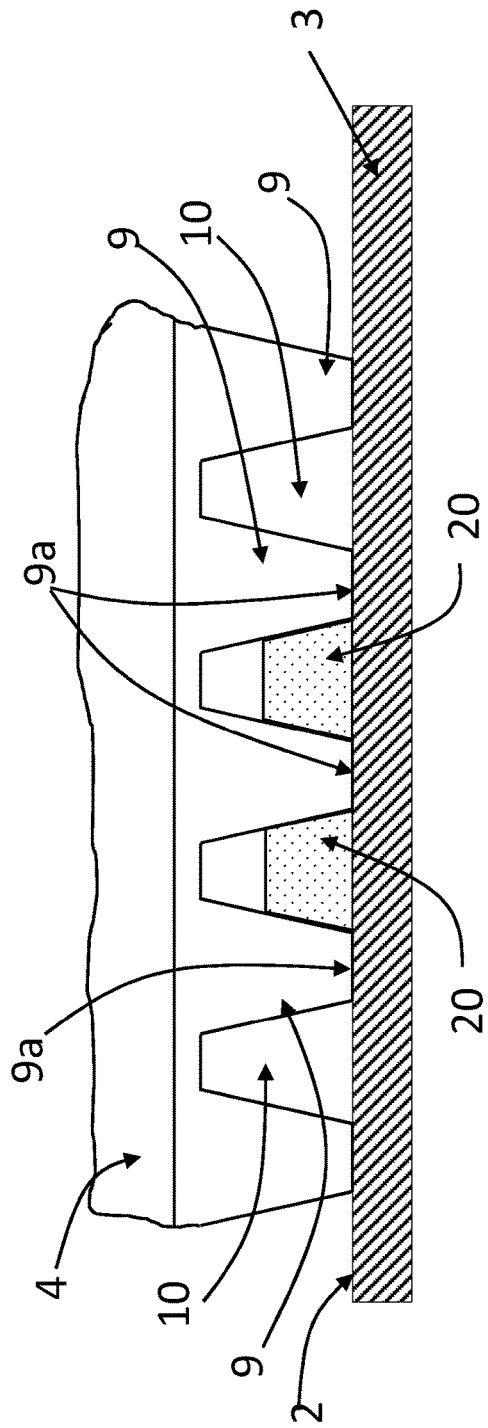

MULTILAYER PANEL FOR THE CONSTRUCTION INDUSTRY AND METHOD FOR THE LAYING OF THE SAME

This invention refers to a multilayer panel for the construction industry, and to the method for the laying of the same.

Nowadays, in the construction trade, particularly when renovating interiors, in order to restore surfaces, such as interior walls or basement floors, when they are damaged by damp or water infiltration, it is known to cover these surfaces with plasterboard panels, which are fixed to these surfaces by interposition of a frame, usually metal, suitable for keeping the panel at a distance from the surface to be covered, so as to allow air circulation between the panel and the surface, necessary for the removal of humidity.

As an alternative to plasterboard panels, multilayer panels are also commonly used, comprising a central layer of extruded plastic foam, enclosed between two waterproofing layers, usually covered with a non-woven fabric. Nevertheless, these known solutions have some drawbacks.

In particular, their installation is particularly laborious and requires a long time in order to be carried out, as it requires first fixing the frame to the surface to be covered, and then fixing the panel to the frame.

In addition, in order to ensure the desired parallelism between the surface to be covered and the panel, a high degree of dimensional accuracy of the frame is required, which increases the cost thereof.

Again, in order to guarantee the desired parallelism between the surface to be covered and the panel, the frame and the panel must be installed by experienced and qualified personnel, with a consequent further increase in installation costs.

The main aim of the present invention is therefore to overcome the above-mentioned drawbacks, and in particular to be able to easily and quickly cover a surface subject to humidity and/or water infiltrations with a panel that is impermeable to water and steam.

In the context of this aim, one object of the present invention is to be able to cover a surface subject to humidity and/or water infiltrations with a panel that is impermeable to water and steam, guaranteeing optimal parallelism between the panel and the surface to be covered, while keeping costs down.

Yet another object is that of being able to cover a surface subject to humidity and/or water infiltration with a panel that is impermeable to water and steam, being able to achieve an optimal parallelism between the panel and the surface to be covered even without particular installation skill and experience.

The aim and the objects according to the present invention are achieved by making a panel for the construction industry suitable for being fixed to cover a surface of a building structure, such panel comprising:
- a first layer, consisting of or comprising an expanded plastic material;
- a second layer, impermeable or substantially impermeable to water and steam, fixed, directly or indirectly, to the first layer, and suitable for being positioned, when the panel is installed, on the side opposite to a surface of a building structure to which the panel is fixed.

The panel comprises a third layer, fixed, directly or indirectly, to the first layer on the side opposite to the second layer, and comprising a plurality of first bulges, spaced apart from each other so as to define an air channel between them, and having the same height, said first bulges being configured to engage, with their free end facing away from the first layer, with a surface of a building structure to which the panel is fixed.

Advantageously, the first layer has a thermal conductivity comprised between 0.02 and 0.035 W/mK; the panel according to the invention, thanks to this reduced thermal conductivity, is therefore a good thermal insulator.

In an advantageous embodiment, the first layer comprises two outer layers made of such expanded plastic material, that enclose an intermediate layer.

Advantageously, the intermediate layer is impermeable or substantially impermeable to methane gas and/or to radon gas and/or to volatile organic compounds (VOC).

Preferably, the intermediate layer consists of or comprises either polyamide (PA) and/or polyethylene terephthalate (PET) and/or Ethylene polyvinyl alcohol (EVOH) and/or metal, or a multilayer membrane composed of a plurality of layers, the same or different from each other, each composed of one or more of these materials.

In a preferred embodiment, such expanded plastic material is or comprises extruded expanded polystyrene foam (XPS) and/or sintered expanded polystyrene (EPS) and/or expanded polyurethane (e.g. of the so-called "PIR" or "PUR" type).

Advantageously, the third layer comprises a number of first bulges per square metre comprised between 1600 and 25000.

More preferably, the third layer comprises a number of first bulges per square metre equal to 23000.

This high density of the first bulges makes the third layer substantially incompressible.

Advantageously, the third layer is impermeable or substantially impermeable to methane gas and/or to radon gas and/or to volatile organic compounds (VOC).

Preferably, the third layer consists of or comprises either polyamide (PA) and/or polyethylene terephthalate (PET) and/or Ethylene polyvinyl alcohol (EVOH) and/or metal, or a multilayer membrane composed of a plurality of layers, the same or different from each other, each composed of one or more of these materials.

In an advantageous embodiment, the third layer has a multilayer structure, and preferably comprises one or more extruded plastic layers, and one or more layers impermeable or substantially impermeable to methane gas and/or to radon gas and/or to volatile organic compounds (VOC); advantageously, the one or more extruded plastic layers comprise polyolefins, polystyrenes, polyamides, polyesters or a combination thereof, and more preferably high density polyethylene (HDPE).

Preferably, the one or more layers impermeable or substantially impermeable to methane gas and/or to radon gas and/or to volatile organic compounds (VOC) comprise polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of such materials.

In an advantageous embodiment, the third layer comprises, on the side opposite to the first layer, a membrane made of non-woven fabric that covers the free end of the first bulges.

Preferably, such a membrane made of non-woven fabric is fixed to the first bulges in such a manner as to replicate the external geometry of the same, or is substantially flat and fixed to the first bulges only at the free end of the same.

In an advantageous embodiment, the second layer is impermeable or substantially impermeable to methane gas and/or to radon gas and/or to volatile organic compounds (VOC).

Preferably, the second layer consists of or comprises either polyamide (PA) and/or polyethylene terephthalate (PET) and/or Ethylene polyvinyl alcohol (EVOH) and/or metal, or a multilayer membrane composed of a plurality of layers, the same or different from each other, each composed of one or more of these materials.

In an advantageous embodiment, the second layer comprises a multilayer membrane.

Preferably, such a multilayer membrane comprises at least one layer that is impermeable to water and steam.

In an advantageous embodiment, such a multilayer membrane comprises at least one layer that is impermeable or substantially impermeable to methane gas and/or to radon gas and/or to volatile organic compounds (VOC).

Advantageously, said layer impermeable or substantially impermeable to methane gas and/or to radon gas and/or to volatile organic compounds (VOC) consists of or comprises polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of said materials.

In a preferred embodiment, the second layer comprises an outer surface, facing away from the first layer, made of a material suitable for being painted.

In an advantageous embodiment, the second layer comprises an embossed plate having second bulges arranged in such a way as to direct the respective open chambers toward a direction opposite to the first layer, so as to allow an adhesive to penetrate into these open chambers for fixing a covering element to the second layer, on the side opposite to the first layer.

In a preferred embodiment, the second bulges have a height of less than or equal to 6 mm, more preferably less than or equal to 4 mm, and the minimum distance between the open chambers of two adjacent second bulges is comprised between 3-13 mm.

In an advantageous embodiment, the panel comprises, interposed between the second layer and the first layer, a first gas-proof layer that is impermeable or substantially impermeable to methane gas and/or to radon gas and/or to volatile organic compounds (VOC).

Advantageously, said first gas-proof layer is made of or comprises polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of said materials.

In an advantageous embodiment, the panel comprises, interposed between the third layer and the first layer, a second gas-proof layer, impermeable or substantially impermeable to methane gas and/or to radon gas and/or to volatile organic compounds (VOC).

Preferably, the second gas-proof layer is made of or comprises polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of these materials.

In an advantageous embodiment, the panel comprises, at a first end of it, a first rabbet and, at a second end of it, opposite to the first end of it, a second rabbet, the first and second rabbet being complementary to each other, so that, placing side by side two of said panels, with the first end of one of said two panels leaning against the second end of the other of said two panels, the first rabbet of one of said two panels mates with the second rabbet of the other of said two panels.

Advantageously, the first rabbet has a thickness that is smaller than the thickness of the second rabbet.

In an advantageous embodiment, the second layer is staggered, in plan, with respect to the first layer, so as to protrude laterally from the latter with a first extreme portion of it and to define with the same, toward the first layer, the first rabbet, the second rabbet being defined by the portion of the first layer facing away from the third layer and not covered by the second layer.

In a further advantageous embodiment, the first rabbet is obtained in the thickness of the first layer, so that between a first extreme portion of the second layer and the first rabbet there is a first portion of the first layer, and the second rabbet is bounded laterally by a second portion of the first layer.

In a further advantageous embodiment, the second layer completely covers the first layer, and the second rabbet is formed by pressing the second layer towards the first layer at the second end of the panel; in a first advantageous variant of this advantageous embodiment, the first rabbet may advantageously be defined by a first extreme portion of the second layer projecting laterally, in plan, with respect to the first layer. In a second advantageous variant of this advantageous embodiment, the first rabbet can be obtained in the thickness of the first layer, so that between a first extreme portion of the second layer and the first rabbet there is a first portion of the first layer.

The above task and objects are also achieved by a method for the laying of a panel according to the invention, which comprises the following steps:

preparing one or more portions of adhesive, in such a quantity that its total volume is less than the total volume of the air channel of the panel;

placing such one or more portions of adhesive between a surface of a building structure and the third layer of the panel, with the free end of the first bulges facing this surface;

exerting a pressure on the panel towards the surface, in such a way that the one or more portions of adhesive are gradually pushed into said air channel until an end of stroke condition is reached wherein the free end of the first bulges engages with the surface.

The features and advantages of the present invention will be more apparent from the following description, which is to be understood as exemplifying and not limiting, with reference to the appended schematic drawings, wherein:

FIG. 1 is a schematic side view of a first embodiment of a panel according to the invention, fixed to a surface to be covered with such a panel;

FIG. 2 is a schematic side view of a detail of the panel in FIG. 1;

FIG. 3 is a schematic side view of a second embodiment of a panel according to the invention;

FIG. 4 is a schematic side view of a third embodiment of a panel according to the invention;

FIG. 5 is a plan view of a detail of the panel in FIG. 4;

FIG. 6 is a schematic side view of a fourth embodiment of a panel according to the invention, installed;

FIG. 7 is a schematic side view of a fifth embodiment of a panel according to the invention;

FIG. 8 is a schematic side view of two panels of the type shown in FIG. 7, installed;

FIG. 9 is a schematic plan view of the panel in FIG. 7;

FIG. 10 is a schematic plan view of the panels in FIG. 8;

FIGS. 13 and 14 are two schematic side views of a detail of a panel according to the invention, in two phases of its installation

Figure 11:
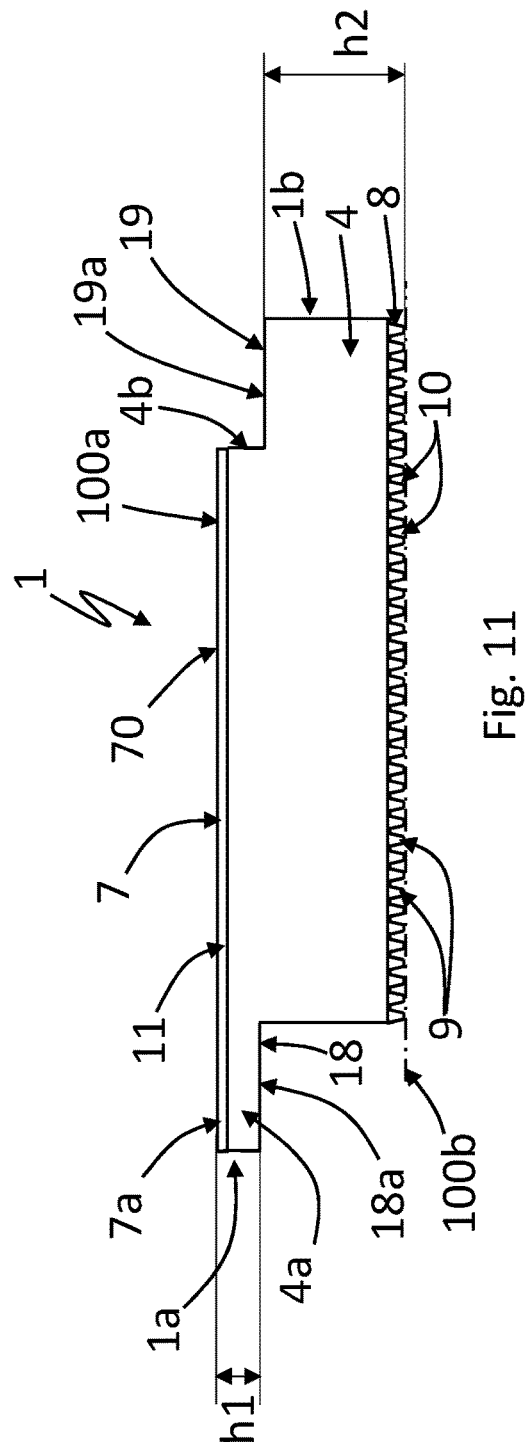
FIG. 11 is a schematic side view of a sixth embodiment of a panel according to the invention.

With reference to the attached figures, a multilayer panel for the construction industry suitable for being fixed to cover a surface 2 of a building structure 3, such as for example a wall, a floor, an attic, etc., is collectively referred to by the number 1, in particular when said surface 2 is damaged by humidity and/or water infiltrations.

The panel 1 comprises a first layer 4, consisting of or comprising an expanded plastic material, preferably closed-cell, such as, for example, the extruded expanded polystyrene (XPS) or the sintered expanded polystyrene (EPS), or the expanded polyurethane (e.g. of the so-called "PIR" or "PUR" type).

It is well known that expanded plastic materials, and in particular the extruded expanded polystyrene (XPS), the sintered expanded polystyrene (EPS), and the expanded polyurethane (both of the PIR type and of the PUR type), are excellent thermal insulators, which thus ensure to the panel 1 to achieve a high thermal insulation.

In an advantageous embodiment, such as, for example, those illustrated in FIGS. 1 and 2, and 4 to 16, the first layer 4 is a single sheet of expanded plastic material, preferably closed-cell, such as, for example, the extruded expanded polystyrene (XPS), or the expanded polystyrene (EPS), or the expanded polyurethane (for example of the so-called "PIR" or "PUR" type), advantageously presenting a thickness comprised between 3-50 mm, more preferably equal to 25 mm.

Advantageously, the first layer 4 has a thermal conductivity of comprised between 0.02 and 0.035 W/mK, making it an excellent thermal insulator.

In a further advantageous embodiment, illustrated for example in FIG. 3, the first layer 4 comprises two outer layers 5a and 5b, made of expanded plastic material, preferably closed-cell, for example the extruded expanded polystyrene (XPS), or the sintered expanded polystyrene (EPS), or the expanded polyurethane (for example of the so-called "PIR" or "PUR" type), which enclose an intermediate layer 6; advantageously, the intermediate layer 6 is impermeable or substantially impermeable to methane gas and/or to radon gas and/or to volatile organic compounds (VOC).

In an advantageous embodiment, the intermediate layer 6 consists of or comprises either polyamide (PA) and/or polyethylene terephthalate (PET) and/or Ethylene polyvinyl alcohol (EVOH) and/or metal, or a multilayer membrane consisting of a plurality of layers, the same or different from each other, each consisting of one or more of said materials.

Advantageously, the intermediate layer 6 is fixed to the outer layers 5a and 5b by bonding, or it can be advantageously incorporated between the two outer layers 5a and 5b during the expansion process of the expanded plastic material which composes them.

Advantageously, the first layer 4 may also comprise a different number of layers of expanded plastic material (which for two different layers may be the same expanded plastic material, or two different expanded plastic materials), preferably closed-cell, such as for example the extruded expanded polystyrene (XPS), the sintered expanded polystyrene (EPS), or the expanded polyurethane (e.g. of the so-called "PIR" or "PUR" type), interspersed two by two by intermediate layers that are preferably impermeable or substantially impermeable to methane gas and/or to radon gas and/or to volatile organic compounds (VOC).

Advantageously, such intermediate layers consist of or comprise either polyamide (PA) and/or polyethylene terephthalate (PET) and/or Ethylene polyvinyl alcohol (EVOH) and/or metal, or a multilayer membrane composed of a plurality of layers, the same or different from each other, each composed of one or more of such materials.

The panel 1 comprises a second layer 7, impermeable or substantially impermeable to water and steam, fixed to the first layer 4, either directly (i.e. in direct contact therewith) or indirectly (i.e. by interposition of one or more further layers), and suitable for being positioned, when the panel 1 is installed, on the side opposite to a surface 2 of a building structure 3 to which the panel 1 is fixed.

Advantageously, the second layer 7 has a thickness comprised between 0.1 and 1.2 mm, more preferably 0.6 mm.

Advantageously, as will be further explained below, the second layer 7 may be made of a single material, or the same may comprise or consist of two or more layers, made of different materials or of the same material, fixed together.

The second layer 7 may be fixed to the first layer 4, for example, by bonding, or, advantageously, the second layer 7, or a part of it, may be partially incorporated into the first layer 4 during the expansion process of the expanded plastic material of the first layer 4.

The panel 1 further comprises a third layer 8, fixed to the first layer 4, either directly (i.e. in direct contact therewith) or indirectly (i.e. by interposition of one or more further layers), on the side opposite to the second layer 7; the third layer 8 comprises a plurality of first bulges 9, spaced apart from each other so as to define an air channel 10 between them, and having the same height, configured to engage, with their free end 9a, facing away from the first layer 4, with a surface 2 of a building structure 3, for example a wall, a floor, an attic, to which the panel 1 is fixed.

Advantageously, the third layer 8 has a thickness comprised between 3 and 20 mm, more preferably 5 mm.

Advantageously, the height of the first bulges 9 is comprised between 2.5-19 mm, preferably equal to 4.5 mm.

Preferably the third layer 8 comprises a number of first bulges 9 per square metre comprised between 1600 and 25000, more preferably 23000. This density of the first bulges 9 makes the third layer 8 substantially incompressible.

Preferably, the third layer 8 is made, completely or partially, of extruded plastic material, such as polyolefins, polystyrenes, polyamides, polyesters or combination thereof, and more preferably of high density polyethylene (HDPE).

In an advantageous embodiment, the third layer 8 is impermeable or substantially impermeable to methane gas and/or to radon gas and/or to volatile organic compounds (VOC); such impermeability may advantageously be achieved, for example, by making the third layer 8, or part of the same, of polyamide (PA) and/or polyethylene terephthalate (PET) and/or Ethylene polyvinyl alcohol (EVOH), and/or metal, or as a multilayer membrane composed of a plurality of layers, the same or different from each other, each composed of one or more of such materials.

In an advantageous embodiment, the third layer 8 has a multilayer structure (i.e., made of multiple layers overlapping each other), and preferably comprises one or more layers made of extruded plastic material, such as for example polyolefins, polystyrenes, polyamides, polyesters or combination thereof, and more preferably high density polyethylene (HDPE), and one or more layers impermeable or substantially impermeable to methane gas and/or to radon gas and/or to volatile organic compounds (VOC), comprising, for example, polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of said materials.

Advantageously, the third layer 8 may be fixed to the first layer 4 by direct bonding, or by bonding on a non-woven fabric, not shown, fixed to the third layer 8, for example by thermo-adhesion, and interposed between the third layer 8 and the first layer 4.

In a further advantageous embodiment, the third layer 8, or a part of it, may be partially incorporated into the first layer 4 during the expansion process of the expanded plastic material of the first layer 4.

Figure 12:
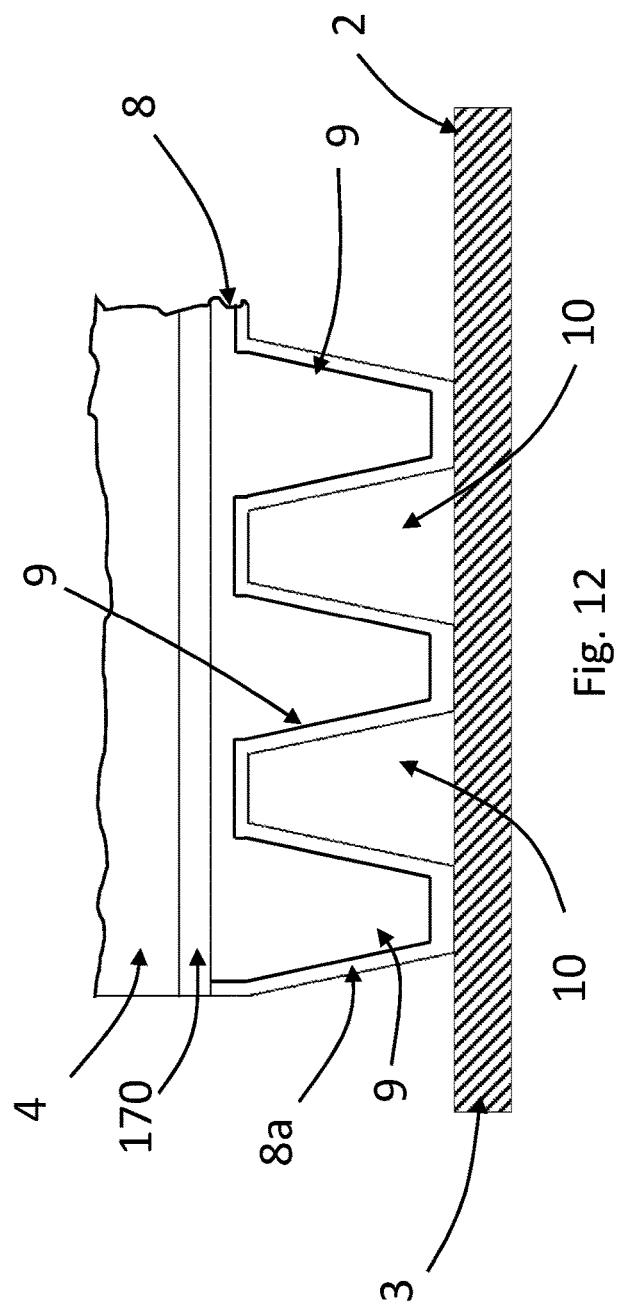
FIG. 12 is a schematic side view of a detail of a seventh embodiment of a panel according to the invention.

In an advantageous embodiment, such as for example that illustrated in FIG. 12, the third layer 8 may comprise, on the side opposite to the first layer 4, a membrane made of non-woven fabric 8a, that covers the free ends 9a of the first bulges 9.

The membrane 8a may advantageously be fixed to the first bulges 9 in such a way as to reproduce the outer geometry thereof, as for example in the advantageous embodiment illustrated in FIG. 12, or the membrane 8a may be substantially flat, and fixed to the first bulges 9 only at the free end 9a of the same.

Advantageously, the membrane 8a can be made of non-woven polypropylene or polyester fabric, for example of the so-called spunlace or spunbond type.

In a further advantageous embodiment, the third layer 8 may have a multilayer structure (i.e., be composed of several layers overlapping each other), and the membrane 8a may be one of the layers composing such a multilayer structure, for example, but not necessarily, together with one or more layers made of extruded plastic material, such as for example polyolefins, polystyrenes, polyamides, polyesters or combination thereof, and more preferably high density polyethylene (HDPE), and/or with one or more layers impermeable or substantially impermeable to methane gas and/or to radon gas and/or to volatile organic compounds (VOC).

The membrane 8a made of non-woven fabric improves the adhesion of the third layer 8 to adhesive substances, such as for example mortar or polyurethane glues, for its fixing to a surface 2 of a building structure 3.

In an advantageous embodiment, the second layer 7 is impermeable or substantially impermeable to methane gas and/or to radon gas and/or to volatile organic compounds (VOC); such impermeability may advantageously be achieved, for example, by making the second layer 7, or part of the same, of polyamide (PA) and/or polyethylene terephthalate (PET) and/or Ethylene polyvinyl alcohol (EVOH), and/or metal, or as a multilayer membrane composed of a plurality of layers, the same or different from each other, each composed of one or more of such materials.

In a further advantageous embodiment, such as for example those illustrated in FIGS. 1 to 3 and 7 to 11, the second layer 7 comprises a multilayer membrane 11; advantageously, the multilayer membrane 11 comprising at least one layer 71, which is impermeable to water and steam.

In an advantageous embodiment, the multilayer membrane 11 comprising at least one layer 72, impermeable or substantially impermeable to methane gas and/or to radon gas and/or to volatile organic compounds (VOC); preferably, said layer 72 is positioned between the water and steam impermeable layer 71, and the first layer 4 of the panel 1.

Advantageously, the layer 72 impermeable or substantially impermeable to methane gas and/or to radon gas and/or to volatile organic compounds (VOC) may, for example, be made of polyamide (PA) and/or polyethylene terephthalate (PET) and/or Ethylene polyvinyl alcohol (EVOH), and/or metal, or as a multilayer membrane composed of a plurality of layers, the same or different from each other, each composed of one or more of such materials.

In an advantageous embodiment, such as, for example, those illustrated in FIGS. 1 to 3 and 7 to 11, the second layer 7 comprises an outer surface 70, facing away from the first layer 4, preferably made of a material suitable for being painted, for example with a water-based paint for walls of buildings; such a material may be, for example, a non-woven fabric of plastic material, for example of the so-called "spunlace" or "spunbond" type.

In the advantageous embodiment in which the second layer 7 comprises a multilayer membrane 11, the outer surface 70 advantageously coincides with the surface of the multilayer membrane 11 facing away from the first layer 4.

In a further advantageous embodiment, such as for example that illustrated in FIGS. 4 to 6, the second layer 7 comprises an embossed plate 12 having second bulges 13 arranged in such a way as to direct the respective open chambers 14 toward a direction opposite to the first layer 4, so as to allow an adhesive 15 to penetrate into the open chambers 14 for fixing a covering element 16 to the second layer 7, on the side opposite to the first layer 4, such as a tile, a stand, etc.

Preferably the second bulges 13 have a height (h) less than or equal to 6 mm, more preferably less than or equal to 4 mm, and the minimum distance (d1, d2) between the open chambers 14 of two contiguous second bulges 13 is comprised between 3-13 mm; such a configuration of the second bulges 13 and of the open chambers 14 thereof enables the embossed plate 12 to obtain a rating of at least "light commercial" in the "Robinson wheel" test according to ASTM C627 standard. In such an advantageous embodiment, the panel 1 can thus be used to cover, for example, a floor or an attic, and then be in turn covered by a covering element 16, protecting this covering element 16 from possible breakage due to the presence of high loads on the same (thanks to the thickness h and to the reduced distance between the open chambers 14 of the second bulges 13, which allows an optimal distribution of the load on the embossed plate 12), and at the same time avoiding the separation between this covering element 16 and the embossed plate 12, since the adhesive 15 penetrates and settles optimally in the open chambers 14 of the second bulges 13.

Advantageously, as an embossed plate 12, the separation membrane claimed in international patent application WO2016120711A2 may be effectively used.

In an advantageous embodiment, the embossed plate 12 may be fixed directly to the first layer 4, for example by means of an adhesive.

In a further advantageous embodiment, not illustrated, the embossed plate 12 may be fixed to a non-woven fabric layer, not illustrated, which is then in turn fixed to the first layer 4.

In an advantageous embodiment, the panel 1 comprises a first gas-proof layer 17, interposed between the second layer 7 and the first layer 4, that is impermeable or substantially impermeable to methane gas and/or to radon gas and/or to volatile organic compounds (VOC).

For example, the first gas-proof layer 17 may consist of or comprise polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of these materials.

Advantageously, in the case where the second layer 7 is an embossed plate 12 of the type described above, the first gas-proof layer 17 may be interposed between it and the first layer 4, as for example in the advantageous embodiment illustrated in FIG. 6; in this case, the first gas-proof layer 17 may be fixed to the embossed sheet 12 in such a way as to reproduce the embossed conformation thereof, or the first gas-proof layer 17 may be substantially flat, and thus be fixed to the second bulges 13 only at the free end thereof.

It is clear that the first gas-proof layer 17 can also be used in case the second layer 7 is, for example, a multilayer membrane 11, or another type of membrane or material.

In a further advantageous embodiment, such as for example that illustrated in FIG. 12, the panel 1 comprises a second gas-proof layer 170, interposed between the third layer 8 and the first layer 4, that is impermeable or substantially impermeable to methane gas and/or to radon gas and/or to volatile organic compounds (VOC).

For example, the second gas-proof layer 170 may consist of or comprise polyamide (PA) and/or polyethylene terephthalate (PET) and/or Ethylene polyvinyl alcohol (EVOH), and/or metal, or a multilayer membrane composed of a plurality of layers, the same or different from each other, each composed of one or more of these materials.

In an advantageous embodiment, such as, for example, that illustrated in FIGS. 7 to 11, the panel 1 comprises, at a first end 1a of it, a first rabbet 18 and, at a second end 1b of it, opposite to the first end 1a, a second rabbet 19; the first and second rabbet are complementary to each other, so that, placing side by side two of said panels, as illustrated for example in FIGS. 8 and 10, with the first end 1a of one of these two panels 1 leaning against the second end 1b of the other panel 1, the first rabbet 18 of one of these two panels 1 mates with the second rabbet 19 of the other panel.

Advantageously, in such a condition, illustrated for example in FIGS. 8 and 10, the panels 1 placed side by side are arranged with the free ends 9a of their first bulges all lying in the same plane, not illustrated, and with the outer surfaces 70 of their second layers 7 arranged in the same plane, also not illustrated.

Advantageously, the thickness h1 of the first rabbet 18 is smaller than the thickness h2 of the second rabbet 19; preferably, the thickness h1 of the first rabbet 18 is smaller than one third of the thickness h2 of the second rabbet 19, more preferably smaller than 2% (two percent) of the thickness h2.

It is pointed out that "thickness of a rabbet" means the maximum distance, measured in the direction of the thickness of panel 1, between the surface of that rabbet suitable for being engaged, in the condition of two panels placed side by side, with the complementary rabbet of a second panel, and the face of panel 1 opposite to that rabbet.

In the advantageous embodiment, illustrated for example in the attached FIGS. 7 to 11, wherein the first rabbet 18 and the second rabbet 19 are parallel to each other and the upper flat face 100a of the panel 1, the distance h1 is the distance between the surface 18a of the first rabbet 18 suitable for being engaged with the second rabbet 19 of a second panel, and the upper flat face 100a of the panel 1 facing, in use, the side opposite to a surface 2 to be covered with the panel 1; in this advantageous embodiment, the distance h2 is the distance between the surface 19a of the second rabbet 19 suitable for being engaged with the first rabbet 18 of a second panel, and the lying plane 100b of the free ends 9a of the first bulges 9.

In an advantageous embodiment, such as that illustrated in FIGS. 8 to 10, the second layer 7 is arranged staggered, in plan, with respect to the first layer 4, so as to protrude laterally from the latter with a first extreme portion 7a of it, which thus defines the first rabbet 18; in such an advantageous embodiment, the second rabbet 19 is defined by the portion of the first layer 4 facing away from the third layer 8 and not covered by the second layer 7.

In a further advantageous embodiment, illustrated for example in FIG. 11, the first rabbet 18 is obtained, for example by milling the first layer 4, in the thickness of the first layer 4, so that, between the first extreme portion 7a of the second layer 7 and the first rabbet 18 there is a first portion 4a of the first layer 4; in the same way, in this advantageous embodiment, the second rabbet 19 is bounded laterally by a second portion 4b of the first layer 4; in this advantageous embodiment, the second rabbet may be, for example, obtained by milling the second layer 7 and the first layer 4.

Figure 15:
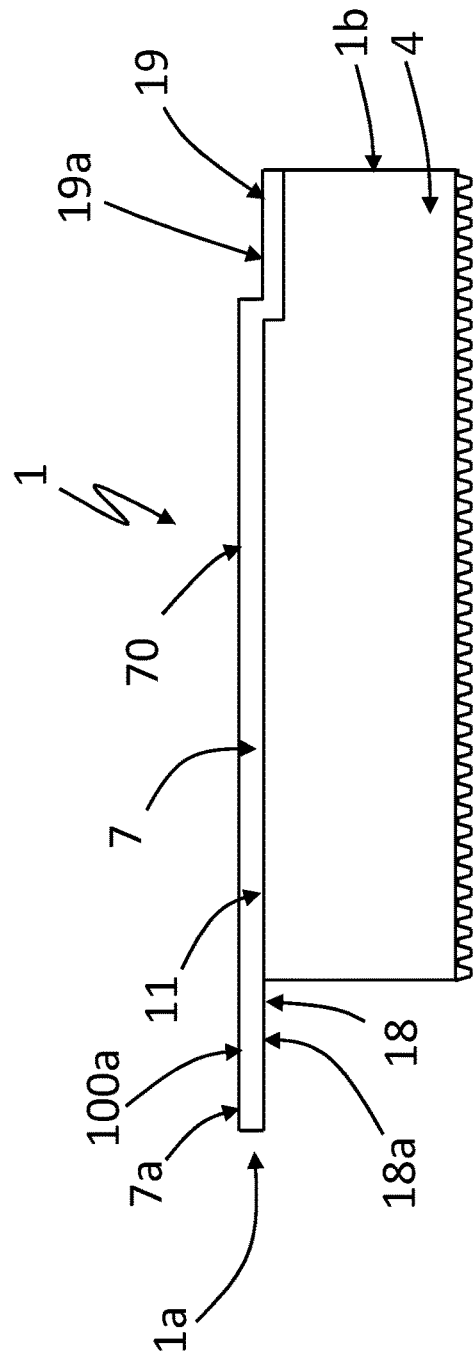
FIG. 15 is a schematic side view of an eighth embodiment of a panel according to the invention.
Figure 16:
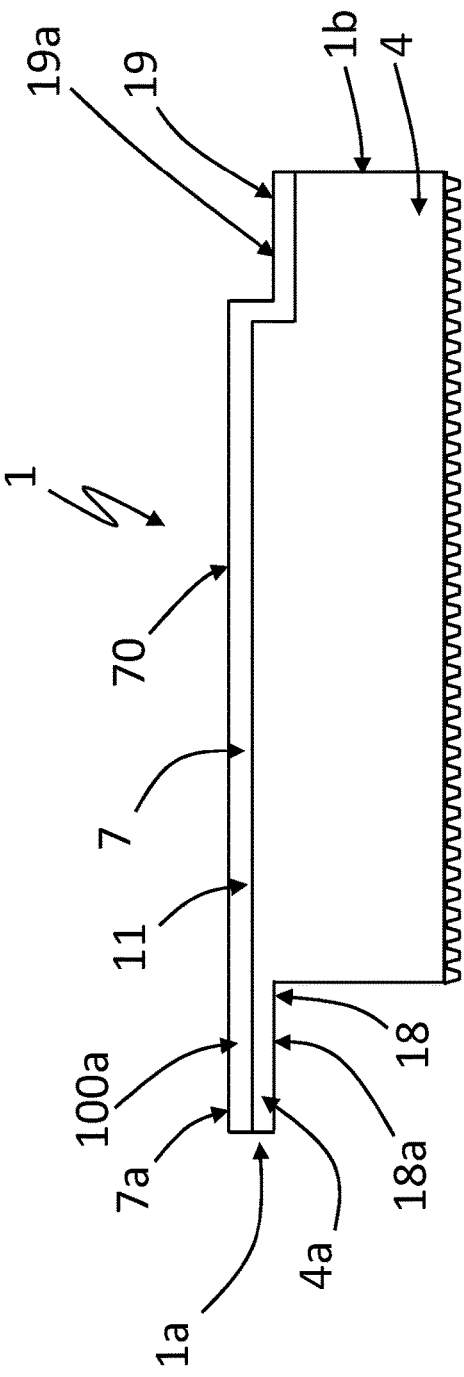
FIG. 16 is a schematic side view of a ninth embodiment of a panel according to the invention.

In a further advantageous embodiment, illustrated for example in FIGS. 15 and 16, the second layer 7 completely covers the first layer 4, and the second rabbet 19 is obtained by pressing the second layer 7 towards the first layer 4 at the second end 1b of the panel 1.

In a first advantageous variant of such an advantageous embodiment, illustrated for example in FIG. 15, the first rabbet 18 may advantageously be defined by a first extreme portion 7a of the first layer 7 laterally protruding, in plan, with respect to the first layer 4. In a second advantageous variant of this advantageous embodiment, illustrated for example in FIG. 16, the first rabbet 18 can be obtained in the thickness of the first layer 4 (for example by milling the first layer 4 itself), so that, between a first extreme portion 7a of the second layer 7 and the first rabbet 18 there is a first portion 4a of the first layer 4.

The functioning of the panel 1 according to the invention is described below.

When it is desired to cover the surface 2 of a building structure 3, such as for example a wall, a floor, an attic, etc., in particular when said surface 2 is damaged by humidity and/or water infiltrations, it is sufficient to prepare one or more portions of adhesive 20, such as for example a mortar, a cementitious glue, an acrylic glue, a polyurethane glue, or a combination of said adhesives, in such a quantity that its total volume of this adhesive 20 is less than the total volume of the air channel 10 of the panel 1.

Such one or more portions of adhesive 20 are then interposed between the third layer 8 of the panel 1 and the surface 2, with the free end 9a of the first bulges 9 facing the surface 2.

The one or more portions of adhesive 20 may, for example, be initially applied on the third layer 8 of the panel 1, in contact with the free end 9a of the first bulges 9, and then said free end 9a may face the surface 2; alternatively, or additionally, one or more portions of adhesive 20 may be applied to the surface 2, and then the panel 1 may be positioned over said portions of adhesive 20, such that the free end 9a of one or more first bulges 9 of it engages with said adhesive 20.

By exerting a pressure on the panel 1 in the direction of the surface 2, said panel 1 advances towards the latter, and the first bulges 9 compress the one or more portions of adhesive 20, which are gradually pushed into the air channel 10.

Once the free end 9a of the first bulges 9 comes into contact with the surface 2, the panel 1 cannot advance any further (as the first bulges 9 are substantially non-deformable), so it stops and leans on it.

The condition in which the free end 9a of the first bulges 9 engages with the surface 2 constitutes therefore an end-stroke condition for the panel 1 with respect to the surface 2; reaching this end-stroke condition ensures a perfect parallelism between the panel 1 and the surface 2, without the need for frames, templates, or other accessories to be used.

It is underlined that the quantity of adhesive 20 is chosen such that, in the end-stroke condition in which the free end 9a of the first bulges 9 is engaged with the surface 2, the air channel 10 is only partially filled with adhesive, so that some air can still circulate in the rest of the air channel 10, and remove humidity from the underlying surface 2. In the case where the building structure 3 to be covered is for example a wall, in the advantageous embodiment in which the second layer 7 comprises an outer surface 70, facing away from the first layer 4, made of a material suitable for being painted, (such as, for example, a non-woven fabric made of plastic material, for example of the so-called "spunlace" or "spunbond" type), the panel 1 according to the invention can be directly painted, without the need to cover the same, for example, with plaster or other material.

In the advantageous embodiment in which the panel 1 comprises the first rabbet 18 and the second rabbet 19, a plurality of panels 1 according to the invention may be applied to the surface 2, placed side by side so that the first rabbet 18 of a panel 1 mates with the second rabbet 19 of the contiguous panel 1; in this way all the various panels 1 placed side by side lie in the same, non-illustrated plane.

Moreover, in such advantageous embodiment, the separation line 100 between two contiguous panels 1 placed at the surface of these panels 1 facing away from the third layer 8, and therefore affecting the second layer 7, penetrates into the panel 1 for a thickness, equal to the thickness h1 of the first rabbet 18, which is shorter than the overall thickness of the panel 1, and preferably shorter than the thickness h2 of the second rabbet 19; this particular configuration is particularly advantageous, in particular in the case in which the outer surface 70 of the second layer 7 can be directly painted, since the reduced thickness (equal to the thickness of the first rabbet h1) of the separation line 100 reduces the risk that this separation line moves, for example due to thermal expansions of the contiguous panels 1 and/or of the underlying building structure 3, damaging the continuity of the painting and/or creating cracks in it. In the advantageous embodiment in which the second layer 7 comprises an embossed plate 12 of the type described above, the panel 1 according to the invention may be fixed, in the manner described above, to a building structure 3 consisting of a floor or an attic; in such a case, after having fixed a panel 1, or a plurality of panels 1 placed side by side, to the surface 2 of the building structure 3, the panel 1 can in turn be covered by a covering element 16, such as, for example, a tile or a stand, protecting the latter, as illustrated above, from possible breakages due to the presence of high loads on the same, and at the same time avoiding the separation between said covering element 16 and the embossed plate 12.

The features of the panel and of the method object of the present invention are clear from the description set forth, as well as the relative advantages.

In fact, the panel according to the invention can be installed easily and quickly, even without special installation skills and experience, and at a low cost.

In particular, the presence of the third layer and the first bulges of the same, the engagement of the free end thereof with a surface to be covered constitutes an end-stroke condition for the panel with respect to that surface, guarantees that a perfect parallelism can be achieved between the panel and the surface to be covered simply by pushing the panel towards the surface to be covered until that end-stroke condition is reached, without the need to use frames, templates or other accessory elements.

It is underlined that, thanks to the presence of the second layer containing an expanded plastic material, the panel according to the invention offers a high thermal insulation (in particular, the first layer can have a thermal conductivity comprised between 0.02 and 0.035 W/mK), thus improving the thermal comfort of the environment in which it is positioned.

Finally, it is clear that the panel and the method according to the invention are susceptible to numerous modifications and variants, all of which are within the scope of the invention; furthermore, all details are replaceable by technically equivalent elements. In practice, the materials used, as well as the dimensions, may be any according to the technical requirements.

The invention claimed is:

1. A panel suitable for being fixed to cover a surface of a building structure, said panel comprising:
   a first layer, consisting of or comprising an expanded plastic material;
   a second layer, impermeable or substantially impermeable to water and steam, fixed, directly or indirectly, to said first layer, and suitable for being positioned, when said panel is installed, on a side opposite to a surface of a building structure to which said panel is fixed; and
   a third layer, fixed, directly or indirectly, to said first layer on a side opposite to said second layer, and comprising a plurality of first bulges, spaced apart from each other so as to define an air channel between them, and having the same height, said first bulges being configured to engage, with their free end, facing away from said first layer, with a surface of a building structure to which said panel is fixed,
   wherein said second layer comprises an external surface, facing away from said first layer, made of a non-woven fabric of plastic material suitable for being painted with a water-based paint for walls of buildings.

2. The panel of claim 1, wherein said first layer has a thermal conductivity of 0.02 to 0.035 W/mK.

3. The panel of claim 1, wherein said first layer comprises two outer layers made of said expanded plastic material, that enclose an intermediate layer.

4. The panel of claim 3, wherein said intermediate layer is impermeable or substantially impermeable to methane gas and/or to radon gas and/or to volatile organic compounds (VOC).

5. The panel of claim 1, wherein said expanded plastic material is or comprises extruded polystyrene foam (XPS) and/or sintered polystyrene foam (EPS) and/or expanded polyurethane foam.

6. The panel of claim 1, wherein said third layer comprises 1600 to 25000 of said first bulges per square meter.

7. The panel of claim 1, wherein said third layer is impermeable or substantially impermeable to methane gas and/or to radon gas and/or to volatile organic compounds (VOC).

8. The panel of claim 1, wherein said third layer comprises, on an opposite side relative to said first layer, a membrane made of non-woven fabric that covers said free end of said first bulges.

9. The panel of claim 1, wherein said second layer is impermeable or substantially impermeable to methane gas and/or to radon gas and/or to volatile organic compounds (VOC).

10. The panel of claim 1, wherein said second layer comprises a multilayer membrane.

11. The panel of claim 10, wherein said multilayer membrane comprises at least an impermeable to water and steam layer.

12. The panel of claim 10, wherein said multilayer membrane comprises at least an impermeable or substantially impermeable to methane gas and/or to radon gas and/or to volatile organic compounds (VOC) layer.

13. The panel of claim 1, wherein said second layer comprises an embossed plate having second bulges arranged in such a way as to direct one or more open chambers toward a direction opposite to said first layer, so as to allow an adhesive to penetrate into said open chambers for fixing a covering element to said second layer, on the side opposite to said first layer.

14. The panel of claim 1, comprising, interposed between said second layer and said first layer, a first gas-proof layer that is impermeable or substantially impermeable to methane gas and/or to radon gas and/or to volatile organic compounds (VOC).

15. The panel of claim 1, comprising, interposed between said third layer and said first layer, a second gas-proof layer that is impermeable or substantially impermeable to methane gas and/or to radon gas and/or to volatile organic compounds (VOC).

16. The panel of claim 1, comprising, at a first end of the panel, a first rabbet and, at a second end of the panel, opposite to said first end, a second rabbet, said first and second rabbet being complementary to each other, so that, placing side by side two of said panels, with said first end of one of said two panels leaning against said second end of the other of said two panels, said first rabbet of one of said two panels mates with said second rabbet of the other of said two panels.

17. The panel of claim 16, wherein said first rabbet has a thickness (h1) that is smaller than the thickness (h2) of said second rabbet.

18. The panel of claim 16, wherein said second layer is staggered, in plan, with respect to said first layer, so as to protrude laterally from the first layer with a first extreme portion of the second layer and to define with the second layer, toward said first layer, said first rabbet, said second rabbet being defined by a portion of said first layer facing away from said third layer and not covered by said second layer.

19. The panel of claim 16, wherein said first rabbet is obtained in the thickness of said first layer, so that, between a first extreme portion of said second layer and said first rabbet there is a first portion of said first layer, and said second rabbet is bounded laterally by a second portion of said first layer.

20. The panel of claim 16, wherein said second layer covers completely said first layer, and said second rabbet is obtained by pressing said second layer against said first layer at the second end of said panel.

21. The panel of claim 20, wherein said first rabbet is defined by a first extreme portion of said second layer laterally protruding, in plan, with respect to said first layer.

22. The panel of claim 20, wherein said first rabbet is obtained in the thickness of said first layer, so that, between a first extreme portion of said second layer and said first rabbet there is a first portion of said first layer.

23. A method for the laying of a panel according to claim 1, comprising:
preparing one or more portions of adhesive, in such a quantity that the total volume of the adhesive is less than the total volume of said air channel of said panel;
placing said one or more portions of adhesive between a surface of a building structure and said third layer of said panel, with said free end of said first bulges facing said surface;
exerting a pressure on said panel towards said surface, in such a way that said one or more portions of adhesive are gradually pushed into said air channel until an end of stroke condition is reached wherein said free end of said first bulges engages with said surface.

* * * * *